INVENTORS
ROBERT E. LACEY
MILTON S. MINTZ
BY Ernest J. ...

INVENTORS
ROBERT E. LACEY
MILTON S. MINTZ

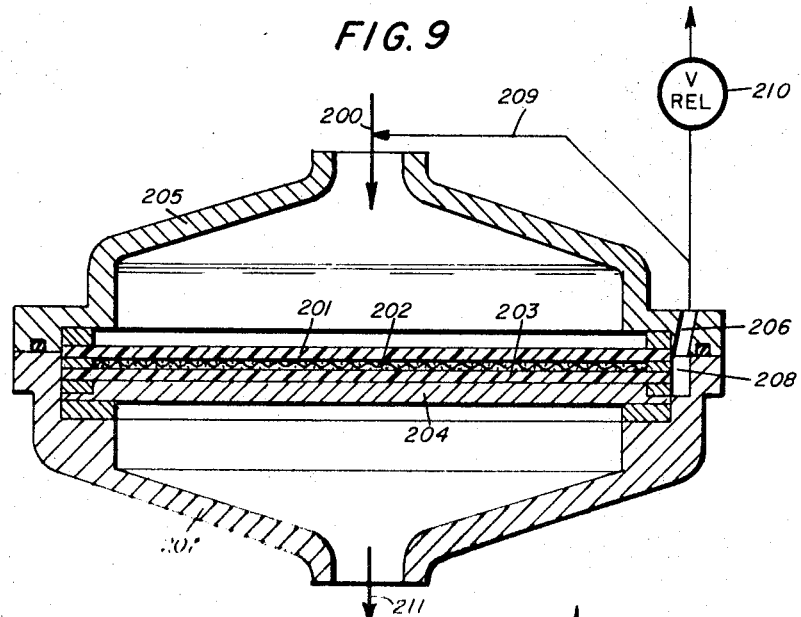
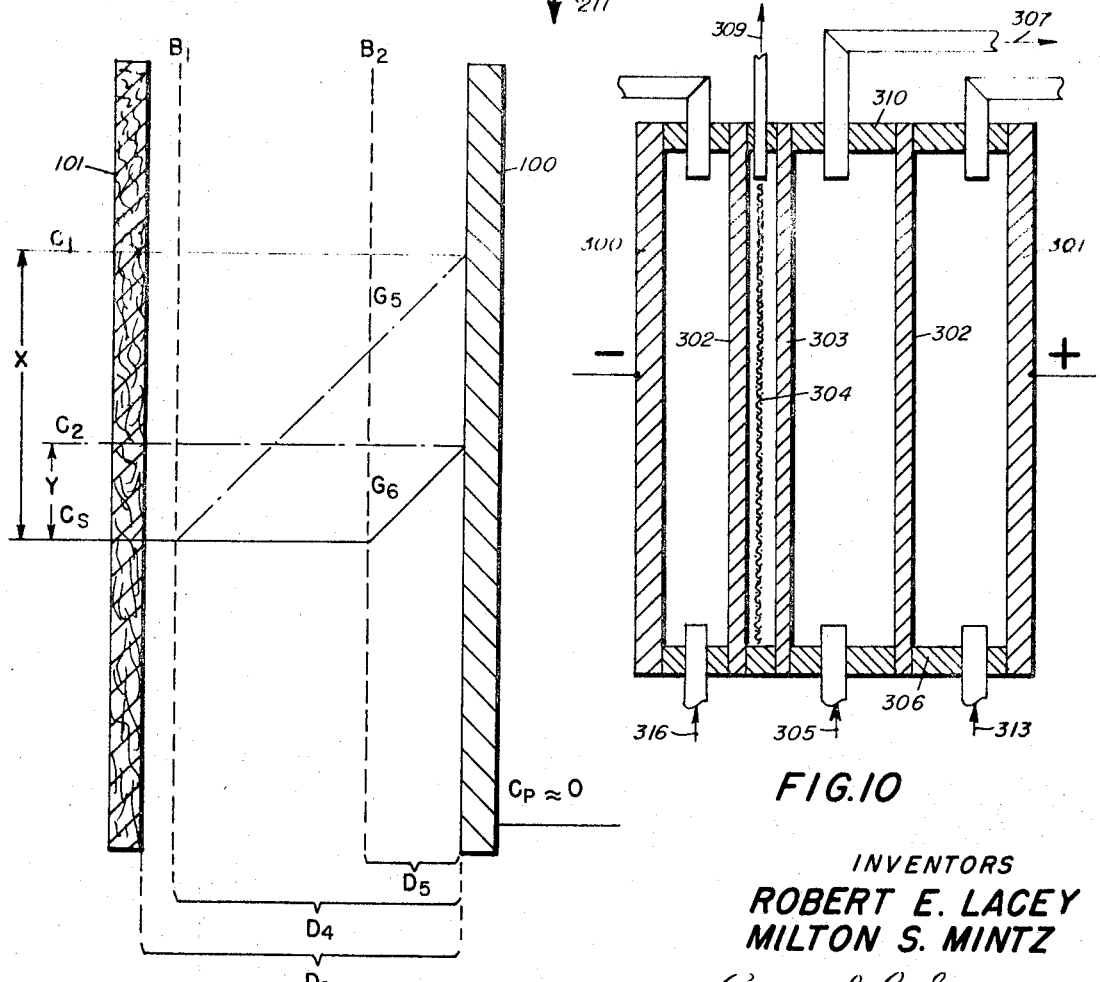

United States Patent Office 3,577,331
Patented May 4, 1971

3,577,331
APPARATUS AND PROCESS FOR EFFECTING CHANGES IN SOLUTION CONCENTRATIONS
Robert E. Lacey, Homewood, Ala., and Milton S. Mintz, Stamford, Conn., assignors to the United States of America as represented by the Secretary of the Interior and Southern Research Institute
Filed June 8, 1967, Ser. No. 645,571
Int. Cl. B01d 13/02
U.S. Cl. 204—180                    16 Claims

ABSTRACT OF THE DISCLOSURE

The present invention relates to an apparatus and a process for effecting changes in solution concentrations wherein a component of the solution is passed through a separatory membrane which is selectively permeable to that component. This invention enhances the efficiency of all existing membrane separation processes by reducing the thickness of the boundary layers formed at the membrane-solution interface. The reduction in thickness is accomplished by placing in spaced relationship to the selectively permeable membrane a second porous membrane permeable to the solution. While the apparatus and process are useful in all membrane separation systems, particular utility is found in electrically driven or pressure-driven desalination systems.

BACKGROUND OF INVENTION

Processes designed to alter the concentrations of solutions by forcing a component of that solution to flow through a selectively permeable membrane to the exclusion of the remaining components have been well known for some time. These processes include: osmosis, dialysis, osmionosis, thermo-osmosis, reverse osmosis, electro-osmosis, electrodialysis, transport depletion with cation-selective and near-neutral membranes, and electrosorption. These processes have been applied to a large number of solute-solvent separations and purifications, including use in artificial kidneys, the concentration of fruit juices, and the pasterurization of beer.

A recent upsurge in interest in membrane processes is traceable to public and private quests for methods designed to desalinate sea water and brackish waters. Among the candidate methods showing promise for extensive use in this area are transport depletion, electrodialysis, and reverse osmosis. These processes have the advantage over thermal desalination methods of not requiring a phase change. Furthermore, unlike the thermal processes, the driving forces required in the membrane processes are directly related to the degree of salinity of the water.

Transport depletion sometimes referred to as a simplified form of electrodialysis is the basis of electrically driven processes. Demineralization depends upon the passage of ions through ion-selective membranes in which these ions have transference number ($t^+$ or $t^-$) different from the transference numbers of such ions in solution. Concentration gradients are established at the faces of the membranes because of these differences in transference numbers. Ion-selective membranes can be all of one type (e.g. either all cationic or all anionic) in a transport-depletion cell. A typical cellular configuration for transport depletion with alternating cation-selective and non-selective membranes comprises a plurality of cation-selective membranes and non-selective membranes disposed between two electrodes. Depletion occurs on the anode side of each cation-selective membrane and concentration on the cathode side. The non-selective membranes serve only to separate the concentrated and diluted solutions. The basic process without the use of non-selective membranes is described in detail in U.S. Pat. 2,923,676 to Deming.

The conventional form of electrodialysis is a similar membrane process in which a driving force of electric current is used to move salt ions through solution. Advantage is taken of the selective qualities of both anionic and cationic membranes to separate the salts. A typical electrodialysis cell consists of alternate catioinic and anionic membranes. When an electromotive force is applied, cations travel through the cation-permeable membranes toward the cathode and anions travel through the anion-permeable membranes toward the anode thus forming depleted and enriched zones in alternate compartments.

Reverse osmosis is a pressure driven membrane process in which the flow of the classical osmosis experiment is reversed by an application of a pressure on the concentrated solution greater than the osmotic pressure difference.

In the electrical processes, demineralization depends upon the formation of concentration gradients at the membrane-solution interfaces because of electrical current flowing through zones in which the ions have transference numbers that are different from their transference numbers in solution. These concentration gradients exist in boundary layer zones adjacent to the membrane surfaces. In these boundary layers the solution may be considered essentially static and ion transfer occurs only by electrical migration and diffusion.

It is the diffusion of electrolyte from the bulk of the solution, through the boundary layer, and toward the depleting membrane-solution interface that results in effective demineralization, and it is the corresponding diffusion of electrolyte from the concentrating membrane-solution interface toward the bulk solution that results in effective concentration.

If these boundary layers are relatively thick, the rate of electrolyte diffusion through them will be slow. A thick boundary layer of partially demineralized water (approaching zero concentration at the depleting membrane solution interface) also represents a high resistance path for the flow of current and causes high electrical energy demand for demineralization.

Attempts have been made, by increasing the electrical current, to transport solution ions through the membranes at a rate greater than the ions can diffuse through the boundary layers. Such attempts have proven futile because the hydrogen and hydroxyl ions present in the boundary layer solution carry the additional current. In practice, therefore, it is found that little additional demineralization or concentration of the original solution occurs.

In reverse osmosis, where solvent water is passed through a semipermeable membrane under the driving force of pressure but salt is rejected, a boundary layer of increased salt concentration is formed at the membrane-solution interface.[1] The driving force necessary to demineralize the solution depends upon the salt concentration at the solution-membrane interface. A relatively thick boundary layer impedes the diffusion of salt back into the bulk solution from the membrane-solution interface and results in a high interfacial concentration. Thus, the driving force required to demineralize a solution of a given concentration is in part dependent upon the thickness of the boundary layer.

Hence, in both the electrically driven membrane processes and in reverse osmosis, it has been recognized that increased efficiencies can be realized by reducing the thick- ---
[1] "Salt Concentration at Phase Boundaries in Desalination Processes," Office of Saline Water Research and Development Progress Report No. 95.

ness of the membrane-solution boundary layers. Previous attempts to accomplish this end have involved either flowing the solutions through the cell compartments at high velocities parallel to the membrane surface, or placing flow-disturbing obstructions in the cell compartments, or both. While these methods do to some extent reduce the thickness of the boundary layer, they alone do not provide an adequate reduction. In addition, the benefits accruing from their use are offset by the considerable amount of pumping energy required by either procedure. Furthermore, the high fluid pressures demanded in these systems necessitate costly high-pressure sealing techniques to prevent both intercompartment and external leaakge of solution which would not otherwise be necessary in the electrical processes.

Consequently, there remains a need in the art for an efficient means to reduce the thickness of the boundary layers present in all membrane separation processes and particularly in desalination systems where because of the high volumes of product needed, improvements in process efficiency become all important.

OBJECTS OF THE INVENTION

Accordingly, the objects of the invention are:

To provide a method and means to reduce the thickness of boundary layers at solution-membrane interfaces in processes wherein the concentration of a solution is altered by passage of a component thereof through a semipermeable membrane.

To provide a method and means to reduce the thickness of boundary layers containing concentration gradients at the membrane solution interfaces in desalination processes wherein water is desalinated by a separation of water and salt caused by the passage of one of those components through a semi-permeable membrane to the exclusion of the other.

To provide a method and means to reduce the thickness of the boundary layers formed at the solution-membrane interfaces in processes using the principle of transport depletion.

To provide a method and means to reduce the thickness of the boundary layers formed at the solution-membrane interfaces in the conventional electrodialysis process.

To provide a method and means to reduce the thickness of the boundary layer formed at the membrane-solution interface in the process of reverse osmosis.

Still further objects and features of the present invention will become apparent from the following description of the invention.

DESCRIPTION OF THE INVENTION

Briefly, the present invention concerns an improved method and apparatus for use in effecting changes in solution concentrations wherein a component of the solution is passed through a selectively permeable membrane. The present improvement comprises positioning a second porous membrane close to the selectively permeable membrane and hydraulically flowing a portion of the feed solution through the porous membrane and toward the selective membrane.

Ion permeable films have previously been used to compartmentalize transport depletion cells. The use of such films has been fully described in Office of Saline Water Research and Development Progress Report No. 80 entitled, "Demineralization by Transport Depletion." Such films however have been designed so as to prevent hydarulic flow. Consequently they serve only as separators and do not in any way perform the function of the present invention.

The use of a porous asbestos diaphragm to compartmentalize an electrolysis cell has been disclosed by C. A. Butler, Jr. et al. in U.S. 3,017,338. The porous diaphragm of that patent performs two functions. It separates the anode from the cation permselective membrane in a caustic producing electrolysis cell thereby forming a center chamber from which there is recovered a partially concentrated caustic solution and it serves to prevent the migration of negative hydroxyl ions produced in the central chamber back toward the positive anode where they would be converted into water and oxygen, the latter of which would cause corrosion problems. The problem central to the present invention, that is, the necessity of reducing the thickness of concentration boundary layers is not discussed in the Butler et al patent nor is there any indication that the problem could be solved through the use of a system such as the present invention.

A porous membrane in a demineralization cell is described by Kollsman in U.S. Pat. 3,309,301. In that system, an electrode causes ions to travel through two closely spaced membranes. The first membrane is of a type which allows the ions to pass through it in a hydrated form whereas the second membrane only allows passage of relatively unhydrated ions. The excess waters of hydration are withdrawn from grooves formed by the partial contact of the two membranes. In the Kollsman system, there is no hydraulic flow other than that caused by the movement of hydrated ions and there is no recognition of the problem of a concentration boundary layer along the permselective membrane nor is there disclosed any configurations which would effect a reduction in thickness of a boundary layer.

The distinctions which the present invention enjoys over the prior art will be more clearly understood from the following description of some preferred embodiments wherein reference is made to the accompanying drawings in which:

FIG. 1 is a schematic diagram showing the reduction of boundary layer thickness achieved when using the present invention in an electrically driven membrane process;

FIG. 2 schematically illustrates the structure and flow plan of transport depletion cells incorporating the present invention;

FIG. 8 schematically illustrates the effect of the present invention in reducing the boundary layer when used in reverse osmosis;

FIG. 9 shows a cellular configuration incorporating the present invention for use in a reverse osmosis process, and FIG. 10 schematically illustrates the test apparatus used to collect the data in Table I.

Figure 1:
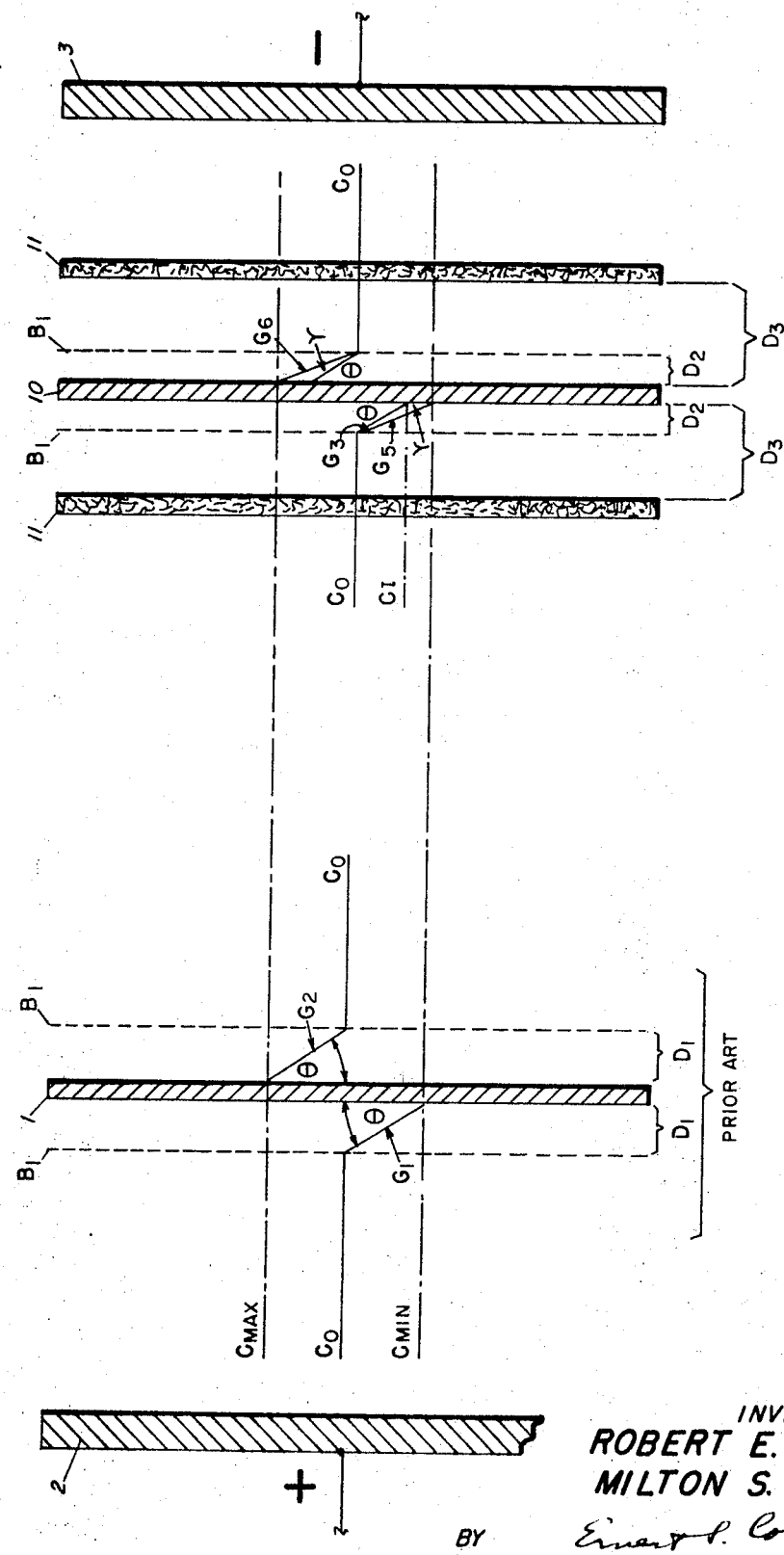

Referring now to FIG. 1, there is shown a comparison of the concentration gradients which form with and without the use of the present invention in electrically driven membrane processes. In that figure, a cation-selective membrane 1 is shown without the use of the present invention. $C_0$ represents the original concentration of electrolyte in solution. In operation, concentration gradients $G_1$ and $G_2$ will form on either side of the cation-selective membrane 1. Gradient $G_1$ represents the concentration gradient on the depleting side of membrane 1 and gradient $G_2$ represents the concentration gradient on the concentrating side of membrane 1. If the cell is operated so that the depleting membrane-solution interface concentration approaches zero shown as $C_{min}$, a corresponding maximum concentration $C_{max}$ will be established at the concentrating membrane-solution interface. It is seen that the concentration gradients are formed within the boundary layer between membrane 1 and lines $B_1$ which represent the edge of the boundary layer. In the conventional processes without the use of the present invention the thicknesses of the boundary layer, $D_1$, are determined by the turbulence produced by solution flow parallel to the cation-selective membrane, 1. In FIG. 1, the concentration gradients are pictured at their maximum; that is, the slopes of G and G (cotangent $\theta$) are at their maximums. FIG. 1 shows the maximum gradient is determined by the initial concentration of electrolyte ($C_0$) and the thickness $D_1$ of the boundary layer. It is evident that, if the boundary layer thicknesses, $D_1$ could be reduced, it would be possible to increase the concentration gradients $G_1$ and $G_2$ respectively between $C_0$ and $C_{min}$ and between $C_{max}$ and $C_0$ respectively which would permit use of higher current densities.

Membrane 10 of FIG. 1 is shown in the cellular configuration which forms a part of the present invention. In this unit, each cation-selective membrane 10 is positioned between two closely spaced porous membranes 11. These porous membranes may be felted mats of fibrous materials such as paper, polyethylene, polypropylene, Dynel, Acrilan, or Nylon; they may consist of porous plastic films such as thin sheets of open-cell polyurethane foam; or they may consist of perforated films of low electrical resistance, such as cellulosic films and parchment. The material out of which the porous membrane is made is not critical. However, the material must have the ability to pass solution fluxes of from about 10 to 650 ml. per minute per square inch of membrane surface under a hydraulic pressure drop of about 2 inches of water. When the porous membrane is to be used in electrically driven processes such as transport depletion, electrodialysis, or electrosorption it is also important that it have a low electrical resistance.

The distance $D_3$ that separates selective membrane 10 from the non-selective porous membranes 11 should be as small as possible to minimize boundary layer thickness but large enough to permit solution flows at reasonable rates in the channel between the porous and selective membranes without excessive pressure drop. Generally this distance $D_3$ will be in the range of from about 0.001 to 0.050 inch.

If the configuration of the present invention is operated at the same current density that establishes the maximum slope of concentration gradients as that in conventional transport depletion, the concentration gradients will have the slopes of lines $G_3$ and $G_4$ and these slopes will be equal to that of lines $G_1$ and $G_2$. However, with the reduction in boundary layer thickness attainable with the present invention, this slope will not result in the minimum concentration of electrolyte $C_{min}$ at the depleting membrane solution interface but instead will result in an intermediate concentration $C_I$. As the current density is increased, the concentration at the membrane interface decreases toward $C_{min}$, and at some higher current density $C_{min}$ will be obtained. When this is done, increased concentration gradients $G_5$ and $G_6$ are formed. The slope of these gradients is $$\frac{C_o - C_{min}}{D_2}$$

or cotangent $\gamma$. A steeper gradient slope causes faster ion diffusion and thus higher throughputs of product can be achieved.

While FIG. 1 illustrates the phenomena under transport depletion conditions cation-selective membranes, the same phenomena occurs in all electrically driven membrane processes.

Hence, the invention may be practiced with either cation-selective or anion-selective membranes, or both, in apparatus of various geometrical shapes, such as rectangular or cylindrical, with sheets or a single spiral, with a single set or a multiple set of electrodes, and with various internal and external combinations of feed and product flow patterns.

Figure 2:
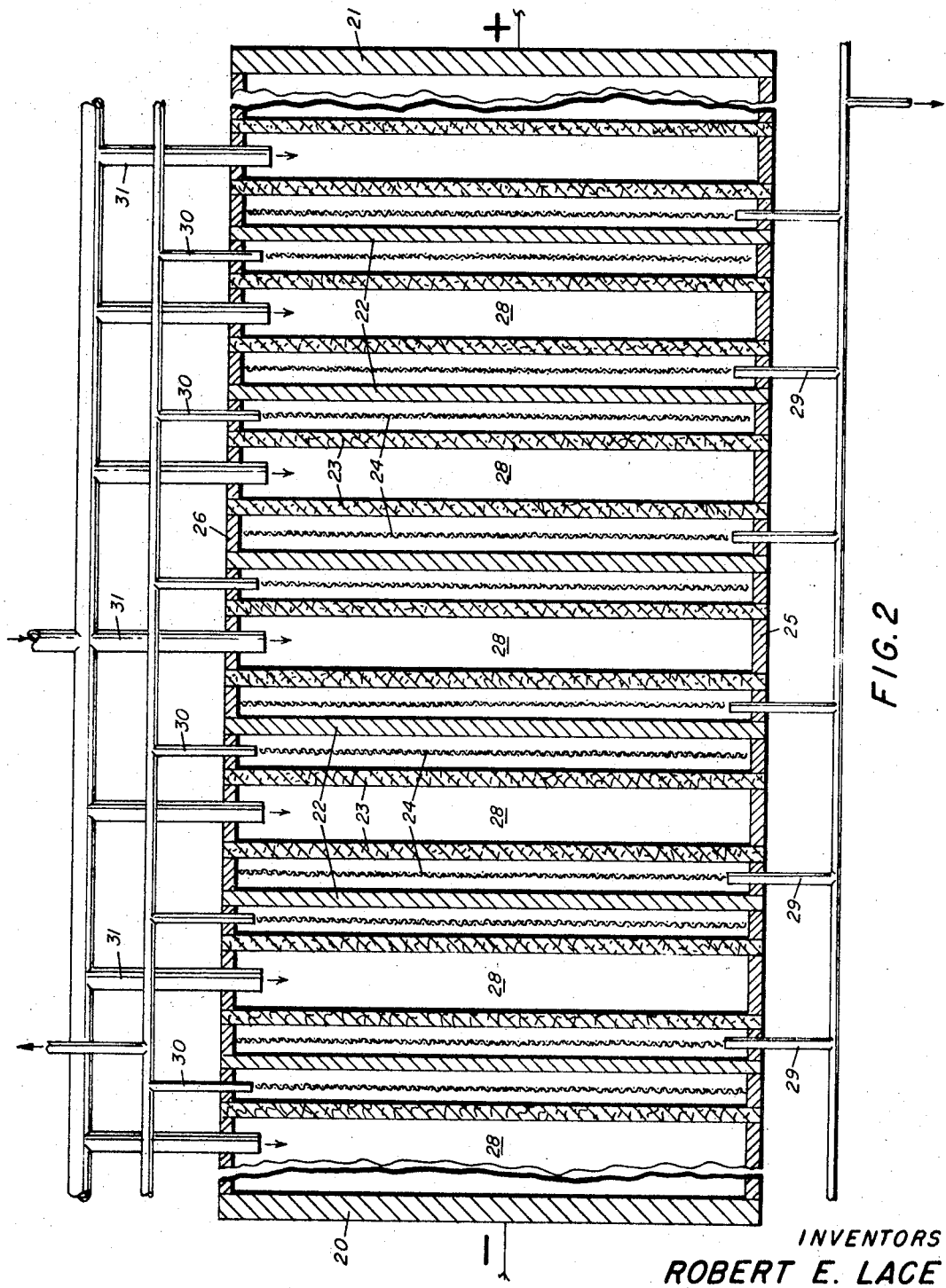

One embodiment of this invention comprises a transport depletion system such as shown partly in cross-section in FIG. 2. In that figure, 20 and 21 are the cathode and anode respectively. Positioned between these driving electrodes is a cellular arrangement comprising cation-selective membranes 22, porous membranes 23, spaced material 24, bottom seal 25, and top seal 26. In this diagram seals at the sides are not shown.

The spacer material may be a net or screen-like material which provides a multiplicity of support locations for membranes 22 and 23, and which is the desired thickness and which allows solution flow parallel to membranes 22 and 23. An example of a suitable material is a thin net of polyethylene. The seals may be gaskets, adhesives, or other equivalent sealing means, the particular design not being critical. A plurality of membranes are mounted between each pair of driving electrodes. A screenlike material (not shown) may be used in spaces 28 between the membrane assemblies to support the membranes and to maintain adequate spacing. Such materials are described in U.S. patents, 2,758,053 and 2,735,812 to Van Hoek, and U.S. Pat. 2,948,668 to De Whalley et al.

In operation, current is supplied to the electrodes, and solution to be demineralized flows through conduits 31 to the feed compartments 28 and through the porous membranes 23. Demineralized solution is withdrawn through conduits 29 from the anode side of all cation-selective membranes and concentrated solution is withdrawn through conduits 30 from the cathode side of all membranes.

Figure 3:
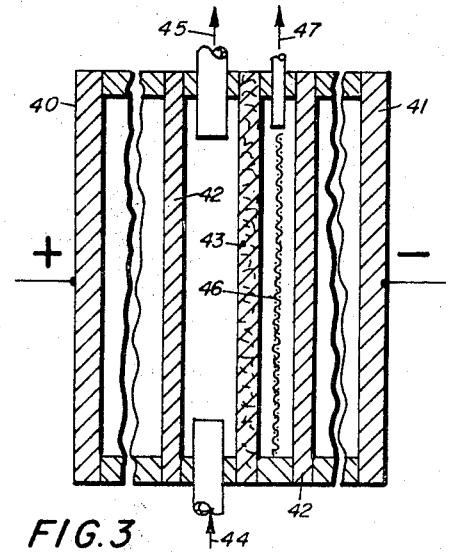
FIGS. 3 and 4 show alternative cellular configurations which may be used in the present invention to carry out the process of transport depletion, wherein a single porous membrane is provided for each selective membrane.
Figure 4:
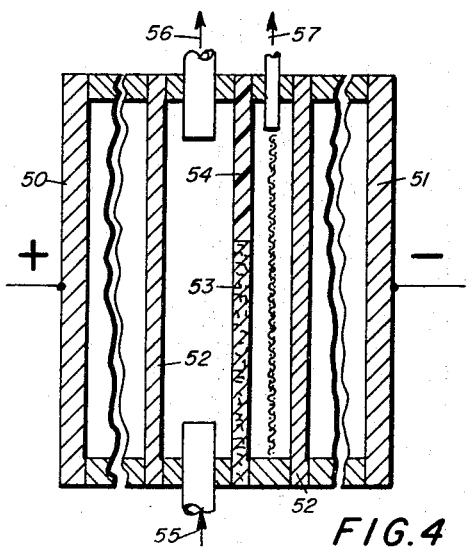

Other embodiments of the present invention as adapted to be used in transport depletion processes are shown in FIGS. 3 and 4. FIG. 3 depicts a cellular arrangement having only one porous membrane between any two cation-selective membranes. In FIG. 3, 40 and 41 represent the anode and cathode respectively. Positioned between these electrodes are a plurality of cation-selective membranes 42. Between each pair of cation-selective membranes is a porous membrane 43, which is separated from the cation-selective membranes by a spacer material 46 which can be any of the materials described as applicable for use as separator 24 in FIG 2. In operation, raw feed 44 is charged to the anode side of the porous membrane (cathode side of cation-selective membranes). Demineralized product 47 leaves from the opposite side of the porous membrane while the concentrated brine 45 is removed from the same side to which the raw feed is charged. The ratio of demineralized product to concentrated brines is controlled by throttling the appropriate effluent lines from the compartments. Either co-current or countercurrent flow of the product solution and concentrated brine with respect to each other may be used.

FIG. 4 illustrates a configuration similar to that shown in FIG. 3 with the exception that the porous membrane 53 contains an essentially nonporous but electrolytically conductive section 54 near the concentrated brine and product withdrawn end of the cell. In the operation of this cell, power is supplied to anode 50 and cathode 51, between which are positioned a plurality of cation-selective membranes 52. Raw feed 55 is charged to the cathode side of the cation-selective membranes. Concentrated brine 56 is withdrawn from that same side while product 57 is withdrawn from the anode side of all the selective membranes.

The purpose in having a section 54 of membrane 53 that is impermeable to product but permeable to ions placed near the outlet end of the product compartment is to prevent the intrusion of concentrated solution in the final increment of demineralization.

Figure 5:
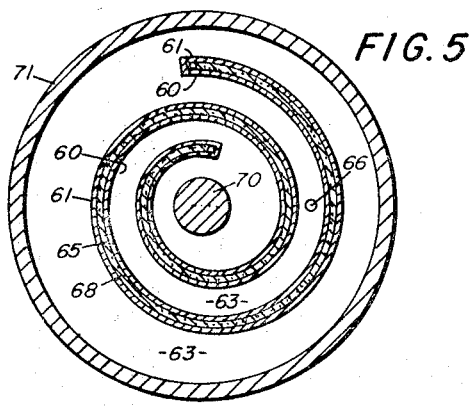
FIG. 5 shows a plan view of a transport depletion system having a tubular configuration.
Figure 6:
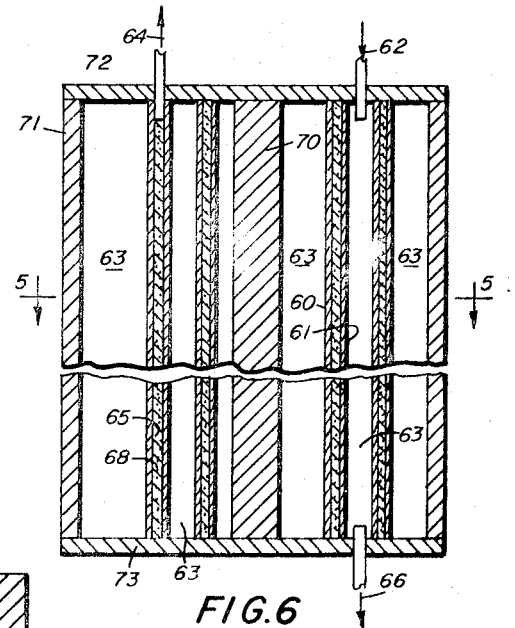
FIG. 6 is an elevational view of the system shown in FIG. 5.

Still another alternative transport depletion configuration is shown in FIGS. 5 and 6. FIG. 5, which is a cross-section of FIG. 6, through 5—5 shows a cation-selective membrane 60, and a porous membrane 61 wound into a spiral configuration about a cathode 70 and within a peripheral anode 71 in a manner similar to that found in the electrodialysis units of U.S. Pat. 2,741,595 to Juda and U.S. Pat 3,192,148 to Chen. A spacer material 68 (FIG. 6), such as previously described, may be used to maintain a uniform distance between the porous and cation selective membranes.

FIG. 6 also illustrates the operational flow plan of this system. Raw feed 62 is introduced into zone or compartment 63 and product 64 is withdrawn from zone or compartment 65 through end portion 72 while concentrated brine 66 from zone 63 is withdrawn through opposite end portion 73. Many variations of this tubular spiral design are possible, for example, two porous membranes may be provided for each ion-selective membrane such as explained in FIG. 2, or, by using both anion- and cation-selective membranes, the configuration may be used as an electrodialysis unit. Furthermore, the direction of product and brine flow may be either co-current or countercurrent as desired. Also, the unit may be positioned either horizontally or vertically and as in the apparatus described in FIG. 4, one end of porous membrane 61 may have a non-porous section.

While the above described embodiments, depicted in FIGS. 2, 3, 4 and 5, are illustrative of the use of the present invention in a transport depletion process wherein only cation-selective membranes are used, the invention is not limited to this system. Anion-selective membranes may be used in place of the cation-selective membranes, or both anion-selective and cation-selective membranes may be used, as well as different configurations and various flow patterns of feed, product and concentrated brine.

Figure 7:
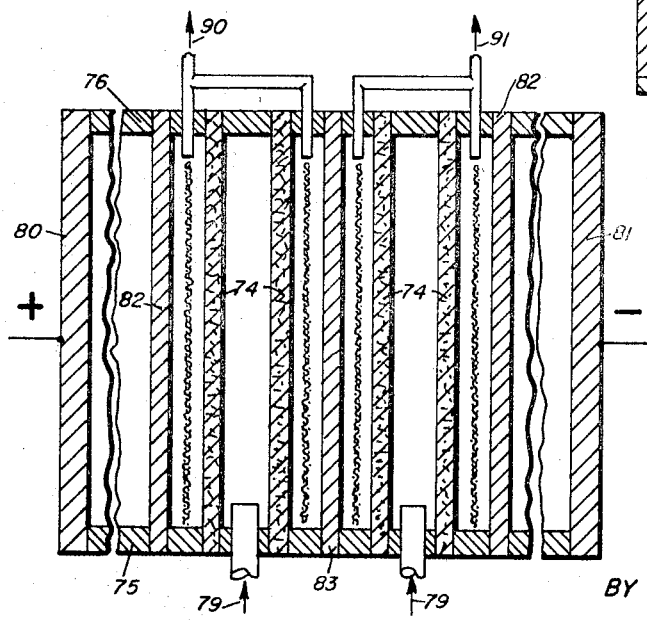
FIG. 7 shows an electrodialysis system incorporating the present invention.

FIG. 7 illustrates the use of the present invention in a system of electrodialysis. In that figure, 80 and 81 are shown as the anode and cathode respectively. Anion-selective membranes 82 and cation-selective membranes 83 are alternately placed between the driving electrodes. Porous membranes 74 are placed on each side of each ion selective membrane. The membranes are held within a bottom seal 75 and a top seal 76.

In operation, electrical energy is supplied to the electrodes, raw feed 79 enters through bottom seal 76, and demineralized product 90, and concentrated brine 91 are withdrawn through top seal 76.

Although the invention has been shown to be applicable to electrically driven membrane processes, its use is not restricted thereto. FIG. 8 shows the effect the present invention has on reducing the thickness of concentration boundary layers when used in reverse osmosis. In that figure 100 is a reverse osmosis membrane, for example, cellulose acetate, and 101 is a non-selective porous membrane. Under conventional operation, a product having a concentration of solute of $C_p$ approaching zero is formed when water is selectively passed through a reverse osmosis membrane 100 by the application of a greater than osmotic pressure on a solution having a solute concentration of $C_s$. In the absence of the porous membrane 101, the exclusion of solute at the membrane-solution interface causes a concentration gradient $G_5$ to form on the solution side of the membrane within the boundary layer enclosed by line $B_1$, that is formed by the usual hydrodynamic forces applied in conventional operation. The thickness of the boundary layer in conventional operation (without the use of the present invention) is pictured as $D_4$. The concentration of solute $C_1$ at the membrane-solution interface is determined by two parameters; the thickness of the boundary layer, $D_4$, and the driving force exerted, in terms of pressure, on the solution. The slope of the concentration gradient $G_5$ is determined by the rate of diffusion of ions from the face of the membrane to the bulk of the feed solution. As can be seen, a thick boundary layer, starting at $B_1$, results in a high concentration of solute $C_1$ at the membrane surface. Since the driving force required is dependent upon the concentration of solute at the membrane-solution interface, it can be seen that the result of a thick boundary layer is a high energy requirement.

If a porous membrane 101 is positioned at a distance $D_6$ from membrane 100 and feed solution flows through membrane 101 and is withdrawn from the space between the two membranes, 100 and 101, the concentration gradient is shifted to a new location, $G_6$. In effect a thinner boundary layer is created starting at $B_2$ and represented by width $D_5$.

With a thinner boundary layer $D_5$, a lower concentration of solute $C_2$, is present at the membrane surface and the result is a lowering of the energy requirements of the system. With conventional reverse osmosis operating without porous membrane 101, the driving force must exceed the osmotic pressure of a solution having a solute concentration of $C_1$. With solution flowing through a porous membrane 101, and the membrane-solution solute concentration reduced to $C_2$, the driving force need only exceed the osmotic pressure of a solution having a solute concentration of $C_2$.

It can be seen that, $\gamma$, the difference between $C_s$ and $C_2$ is dpeendent upon distance $D_5$. The spacing $D_6$ between the selective membrane 100 and the porous non-selective membrane 101 should be as small as it can be made and still provide for adequate withdrawal of the solution that flows through membrane 101. Generally, spacing $D_6$ will be in the range of about 0.001 to 0.050 inch.

FIG. 9 illustrates a reverse osmosis system incorporating the present invention. The solution 200 to be demineralized is pressurized and introduced into a cell similar to those used in conventional reverse osmosis, and the solution flows to the top surface of a porous membrane 201 that is positioned the desired distance from the selective side of a reverse osmosis membrane 203 by a net or mesh spacer 202. The reverse osmosis membrane 203 rests on and is supported by a membrane support 204 of the type used in conventional reverse osmosis. Slots 208 at one edge of the net spacer 202 (or part way around the perimeter of a circular cell) interconnect with withdrawal ducts 206 so that the feed solution flows through the porous membrane 201 toward the reverse osmosis membrane 203 and then through the solution channel formed by the net spacer 202 and the two membranes 201 and 203 to the slots at the edges of the cell 208 and is withdrawn through the ducts 206. This solution may be recycled and mixed with fresh feed (via 209) or it may be discarded to a waste stream through a pressure reducing valve 210. The demineralized water 211 that is transferred through the reverse osmosis membrane 203 goes through the membrane support 204 and is withdrawn through conventional means 207 of enclosing and withdrawing the product.

As well as being useful in all membrane separation processes, the present invention may be used with a large combination of solutes and solvents. In the electrically driven processes, the solute must be capable of electrical migration but this limitation does not apply to non-electrically driven processes such as reverse osmosis. Particular utility of this invention is found in processes designed to desalinate sea water or brackish waters.

The benefits and advantages of this invention are evident from the results of demineralization experiments in a demineralization unit utilizing this invention.

Measurements were obtained from runs made with the cell depicted in FIG. 10. As shown, the test cell comprised driving electrodes 300 and 301, cation-selective membranes 302, porous membrane 303 and screen spacer 304 and bottom and top seal 306 and 310. Raw feed 305 was introduced through bottom seal 306 and concentrated brine 307 was withdrawn from the same compartment through top seal 310. Demineralized product water 309 was also withdrawn through top seal 310. Feed water 316 adjusted to pH of 4 was introduced through bottom seal 306 and withdrawn through top seal 310 to rinse cathode 300. Likewise, feed water 313 adjusted to a pH of 10 was introduced through bottom seal 306 and withdrawn through top seal 310 to rinse anode 301.

The effective transport area of the cell was 1" x 6" (38.7 cm.$^2$). The screen spacer was 0.0055" in thickness and was made of polyethylene. The cation-selective membrane was type MC-3142 made by Ionac Chemical Company, and the porous material used was conventional filter paper No. 950 made by the Eaton-Dikeman Company and in one instance a conventional filter paper No. 914 made by the same company.

A 0.03 N NaCl solution was used as the feed. The proportion of feed water passing through the filter paper 303 to form the demineralized product water stream was controlled by throttling the brine effluent line. The rinse solutions were passed through the compartments adjacent the electrodes to preclude the transport of hydrogen and hydroxyl ions through the end membrane to the demineralization compartments. The results of runs through this apparatus are shown in Table I.

It can be seen from these results that very high degrees of demineralization (e.g. 0.309 N NaCl to 0.004 N NaCl) were achieved in a single pass through the 6″ long cell at the relatively high production rate of 6.0 ml./min. (58 gallons per day per square foot of effective transport area). One square foot of effective transport area consists of one square foot of cation-selective membrane plus one square foot of filter paper. At the unusually high production rate of 17 ml./min. (163 g.p.d./ft.$^2$) good demineralization (e.g., 0.0313 N NaCl to 0.0131 N NaCl) was also achieved. Production rates for conventional electrodialysis plants in which 0.03 N solutions are demineralized to about 0.0083 N are from 20 to 40 g.p.d./ft.$^2$. The indicated coulomb efficiencies, which were as high as 0.70 are also of interest, as previously it had been believed that the highest coulomb efficiency obtainable with such a cell was 0.61.

(c) means communicating with the space between said first and second membranes and adapted to withdraw solution of altered concentration from the space between said first and second membranes.

2. The aparatus of claim 1 wherein said permselective membrane is selectively permeable to cations.

3. The apparatus of claim 1 wherein said permselective membrane is selectively permeable to anions.

4. The apparatus of claim 1 wherein there is a plurality of first membranes positioned between two electrodes, one a cathode and the other an anode, and a corresponding plurality of substantially permeable second membranes in spaced relationship to said permselective membranes.

5. The apparatus of claim 4 wherein said first membranes are selectively permeable to cations, and wherein means to maintain a uniform spacing are positioned between said first membrane and said second membrane.

6. The apparatus of claim 5 wherein there is a said second membrane on both the cathode and the anode side of each first membrane.

7. The apparatus of claim 5 wherein there is one said second membrane in spaced relationship to each first membrane and it is positioned on the anode side thereof.

8. The apparatus of claim 7 wherein a portion of said second membrane adjacent to said means of withdrawing concentrated brine and means of withdrawing product is non-porous.

9. The apparatus of claim 1 wherein said first and said second membranes are rolled in a spiral about an axis while maintaining the spaced relationship between the TABLE I.—RESULTS OF DEMINERALIZATION EXPERIMENTS WITH NaCl SOLUTIONS IN THE APPARATUS OF FIG. 10

|  | Product flow rate | | Concentrate flow rate, ml./min. | Current density, ma./cm.$^2$ | Concentration eq./l | | Coulomb efficiency [a] |
| --- | --- | --- | --- | --- | --- | --- | --- |
|  | Ml./min. | G.p.d./ft.$^2$ |  |  | Feed | Product |  |
| Filter paper: |  |  |  |  |  |  |  |
| E-D 950 | 6.0 | 58 | 484 | 7.9 | 0.0301 | 0.0085 | 0.70 |
| E-D 950 | 5.5 | 53 | 363 | 5.7 | 0.0302 | 0.0133 | 0.68 |
| E-D 950 | 20.0 | 191 | 348 | 15.6 | 0.0302 | 0.0177 | 0.67 |
| E-D 950 | 27.0 | 258 | 283 | 18.4 | 0.3302 | 0.0211 | 0.56 |
| E-D 950 | 5.7 | 55 | 82 | 8.4 | 0.0309 | 0.0072 | 0.67 |
| E-D 950 | 6.0 | 58 | 82 | 9.7 | 0.0309 | 0.0049 | 0.67 |
| E-D 914 | 17.0 | 163 | 59 | 20.6 | 0.0313 | 0.0131 | 0.61 |

[a] Coulomb efficiency $= \frac{(N_t - N_e)(Q)(f)}{It}$ where
$N_t$ = Normality of feed, eq./l.
$N_e$ = Normality of effluent, eq./l.
$Q$ = Water demineralized, liters.
$f$ = Faraday constant, amp sec./eq.
$I$ = Current, amps.
$t$ = Time, sec.

The greater production rates per unit of membrane area obtainable when using the present invention make possible a reduction in membrane replacement costs of a conventional electrodialysis system, since less membrane area is needed to produce a given amount of product water. High throughput rates reduce the size of the equipment necessary and might substantially reduce capital costs. The present invention provides lower cell-pair resistances compared to those of conventional electrodialysis processes because of the reduced thickness of the depleted-solution boundary layer. This reduced electrical resistance provides lower energy consumption per unit of product water.

While the apparatus and process of the present invention have been described in terms of preferred embodiments, alterations and adaptions are possible within the spirit and scope of the invention concepts which are particularly pointed out and claimed hereinbelow.

What is claimed is:

1. A compartmented apparatus for altering the concentration of a solution comprising:
   (a) a first permselective membrane;
   (b) a second membrane substantially permeable to said solution positioned in a substantially parallel spaced relationship at a substantially constant distance of from about 0.001 to 0.050 inch from at least one side of said first membrane, and said first membrane and said second membrane and wherein said process is driven by a first axial electrode and a second oppositely charged peripheral electrode.

10. The apparatus of claim 4 wherein said first membranes are alternately cation-selective and anion-selective and wherein each of said first membranes other than the two terminal first membranes closest to the electrodes have associated therewith two of said second membranes one located on either side thereof forming spaces bounded by two of said second membranes, said terminal membranes each having one second membrane associated therewith.

11. The apparatus of claim 10 wherein means are provided to maintain said second membranes in a uniformly spaced relationship to said first membranes.

12. The apparatus of claim 11 wherein means are provided to feed solution to the spaces bounded by two of said second membranes, means are provided to withdraw solution from the spaces bounded by the anode sides of all the cation-selective membranes and the said second membranes and further means are provided to withdraw dilute solution from the spaces bounded by the cathode sides of all anion-selective membranes and the said second membranes, and means to withdraw concentrated solution from the spaces bounded by the cathode sides of all cation-selective membranes and the said second membranes and the spaces bounded by the anode sides of all anion-selective membranes and the said second membranes.

13. The apparatus of claim 10 wherein means are provided to maintain a uniform distance between said first membranes and said second membranes.

14. In a process for altering the concentration of a solution wherein a portion of one component of said solution is passed through a membrane selectively permeable to said component by the application of a driving force and wherein a boundary layer is formed within said solution at the selectively permeable membrane-solution interface, the improvement comprising causing said solution to first pass through a permeable membrane not selective as to the components of said solution and extending in substantially parallel relationship along at least one side of and spaced at a distance of from .001 to .050 inch from said selectively permeable membrane whereby the thickness of said boundary layer is reduced.

15. The process of claim 14 wherein said driving force is electrical potential.

16. The process of claim 14 wherein a major component of said solution is water.

References Cited

UNITED STATES PATENTS

| 3,309,301 | 3/1967 | Kollsman | 204—180 |
|---|---|---|---|
| 3,392,100 | 7/1968 | Kollsman | 204—180 |
| 3,440,159 | 4/1969 | McRae et al. | 204—180 |

JOHN H. MACK, Primary Examiner

A. C. PRESCOTT, Assistant Examiner

U.S. Cl. X.R.

204—301